(12) United States Patent
Racz et al.

(10) Patent No.: US 7,232,179 B1
(45) Date of Patent: Jun. 19, 2007

(54) MODULAR DAY/SLEEPER CAB AND INTERFACE THEREFOR

(75) Inventors: Nikolaus G. Racz, Colfax, NC (US); David S. Adams, Macungie, PA (US); Martin Luckhaus, Gothenburg (SE); John M. Martin, Madison, NC (US); Linton D. Myers, Lenhartsville, PA (US)

(73) Assignee: Volvo Trucks North America, Greensboro, NC (US)

( * ) Notice: Subject to any disclaimer, the term of this patent is extended or adjusted under 35 U.S.C. 154(b) by 0 days.

(21) Appl. No.: 11/306,149

(22) Filed: Dec. 16, 2005

(51) Int. Cl.
*B60J 7/00* (2006.01)
(52) U.S. Cl. .............................. 296/190.02; 296/190.08
(58) Field of Classification Search ............ 296/190.02, 296/190.08, 29, 180.1, 180.2
See application file for complete search history.

(56) References Cited

U.S. PATENT DOCUMENTS

| | | | | |
|---|---|---|---|---|
| 3,879,081 A | | 4/1975 | Hockley et al. | |
| 4,883,307 A | * | 11/1989 | Hacker et al. | ............ 296/180.2 |
| 5,310,239 A | * | 5/1994 | Koske et al. | .......... 296/190.02 |
| 5,560,673 A | * | 10/1996 | Angelo | .................. 296/190.02 |
| D384,914 S | * | 10/1997 | Bingaman | ..................... D12/97 |
| 5,863,093 A | * | 1/1999 | Novoa et al. | .......... 296/190.08 |
| 6,012,765 A | * | 1/2000 | Novoa et al. | .......... 296/190.08 |
| 6,120,089 A | * | 9/2000 | Kalstiantz et al. | ..... 296/190.02 |
| D465,749 S | * | 11/2002 | Beigel | ......................... D12/96 |
| 6,520,565 B1 | * | 2/2003 | Kjellberg | ............... 296/190.08 |
| 6,557,230 B1 | | 5/2003 | Gernstein | |
| 6,625,860 B1 | | 9/2003 | Gernstein | |
| 6,682,129 B2 | * | 1/2004 | Baggett et al. | ........ 296/190.02 |
| 6,719,361 B1 | * | 4/2004 | Adams et al. | .......... 296/190.01 |
| 6,883,860 B1 | * | 4/2005 | Budge | .................... 296/190.08 |
| 6,935,679 B2 | * | 8/2005 | Myers et al. | .......... 296/190.02 |
| 7,140,671 B2 | * | 11/2006 | Frazier et al. | ......... 296/190.08 |
| 2005/0242622 A1 | * | 11/2005 | Myers et al. | .......... 296/190.02 |

* cited by examiner

*Primary Examiner*—Kiran B. Patel
(74) *Attorney, Agent, or Firm*—Novak Druce & Quigg, LLP

(57) ABSTRACT

Method and arrangement for providing a modular tractor assembly including a driver compartment having a rearward connecting edge configured to slidably receive a complementary forward connecting edge of one of a day compartment module, a sleeper compartment module, or an inter-modular fairing connector assembly. A portion of the rearward connecting edge of the driver compartment has a flange portion disposed at an acute angle relative to a long axis of the tractor for complementarily receiving a forward connecting edge of one of the day compartment module, the sleeper compartment module and the inter-modular fairing connector assembly. The interface between the driver compartment and the day compartment module, a sleeper compartment module, or an inter-modular fairing connector assembly is substantially hidden by the doors of the vehicle to provide an aesthetically pleasing appearance.

16 Claims, 16 Drawing Sheets

MODULAR DAY/SLEEPER CAB AND INTERFACE THEREFOR

FIELD OF THE INVENTION

The present invention relates to semi-trucks, and more specifically to apparatus and methods that enable the installation of different-width sleeper cabs on a given truck and which facilitate the conversion of a semi-truck from a sleeper configuration to a day configuration.

BACKGROUND OF THE INVENTION

There are generally two types of semi-truck used for transporting cargo: long haul trucks and short haul trucks. Long haul trucks are typically equipped with sleeper compartments that allow drivers to sleep or rest when transporting cargo over long distances. Because of this, such long haul trucks are commonly referred to as having sleeper cabs. Short haul trucks on the other hand are typically only utilized for transporting cargo over short distances and which can be completed in a single day. Short haul trucks, thus, are commonly referred to as having day cabs.

In order to permit occupants to move between the driver and sleeper compartments, the driver compartment is provided with a back-side opening and the sleeper compartment is provided with a corresponding front-side opening that when aligned and joined together form a an occupant-passage between the two compartments.

Generally, after an initial period of road use, long haul truck owners and operators find it economically prudent to remove their long haul trucks from service and utilize them as short haul trucks and/or to sell their long haul trucks, typically for short haul use. A problem with this, however, is that the former long haul trucks include sleeper cabs, which are not needed for short haul use. Additionally, the sleeper cabs tend to detrimentally affect the resale value of the trucks. Thus, it is desirable to convert a sleeper cab into a day cab.

Several factors can affect the ease by which a sleeper cab can be converted into a day cab. However, perhaps the factor most affecting the ease of conversion is whether the sleeper cab was originally constructed to be integral with the driver compartment of the truck, or whether it was prefabricated and subsequently mated with the driver compartment during assembly, i.e., a modular sleeper cab. Generally, as described and illustrated in U.S. Pat. No. 6,883,860, the conversion of a truck from an integral sleeper cab into a day cab requires the removal of interior components such as seats, carpeting, insulation, and can require that structural beams and body panels be cut. Consequently, it is generally desirable to construct long haul trucks utilizing removable modular sleeper cabs because the sleeper cabs can be readily removed when the semi-truck is removed from long haul service.

A problem with constructing long haul trucks utilizing modular sleeper cabs, however, is that the driver compartments and sleeper cabs come in many different lengths, widths and heights, which can make it difficult to mate various driver compartments with different sleeper cabs. For example, the back-side opening of one type of driver compartment may differ from the front-side opening of a mated day or sleeper cab in such a way that the two connected compartments are not fully "open" to one another, which detrimentally restricts the established occupant passage therebetween.

Another issue that arises even when the openings are configured to mate-up with one another is that due to manufacturing tolerances and the like there will usually not be exact matings of the openings. Therefore, the need has been recognized to utilize take-up devices, of sorts, that allow for the compensation of these inexactnesses and the establishment of suitable alignment, or accommodation of acceptable misalignment between mated compartments.

In another respect, when a back compartment (sleeper or day cab) has an exterior width greater than that of the driver compartment (see FIG. 1C where the expansion to the sleeper cab is abrupt with a flat, forward-facing surface), the transition has not traditionally been particularly aerodynamic, with the result being a negative impact on fuel economy for the truck.

Another problem with using today's modular sleeping cabs is that the interface between a driver compartment and the sleeper cab may not be as "solid" as in trucks in which the sleeper cab is integral with the driver compartment module. Consequently, a truck having a modular cab can experience increased vibration and road noise when compared with that of a truck having an integral sleeper cab. Also, the interface between a modular sleeper cab and a driver compartment may not be as aesthetically pleasing when compared with a truck having an integral sleeper cab. Furthermore, many modular sleeper cabs are specifically designed to mate with certain driver compartments, thus limiting their reuse or installation on other trucks.

In view of the above and related deficiencies, there is presently a need to provide an interface or adapter that can be used for enabling access between variously configured modular sleeper cabs and mated driver compartments, and which more effectively and stably interconnects the sleeper cab and driver compartment. Still further, it is preferred that these interfaces be aerodynamic and provide an appearance that the modular sleeper cab is integrally formed with the driver compartment of the truck.

SUMMARY OF THE INVENTION

In an effort to address the above-identified problems, in one embodiment the present invention takes the form of a modular tractor assembly including a driver compartment module having a rearward connecting edge configured to receive a complementary forward connecting edge of either (1) a day compartment module, (2) a sleeper compartment module, or (3) an inter-modular fairing connector assembly (also referred to as a flared adaptor) that facilitates the installation of a wider-width sleeper compartment module. In some embodiments, a portion of a rearward connecting edge around the backside opening in the driver compartment module takes the form of a flange disposed at, for example, an acute angle relative to a long axis of the tractor for complementarily receiving a forward connecting edge of a compartment (sleeper or day compartment, for instance) to be mounted therebehind, or an inter-compartment, flared connector as will hereinafter be described in greater detail.

In some preferred embodiments, the flange portion extends from a B-post of the driver compartment module. The rearward and forward connecting edges of the driver compartment module and the inter-modular fairing connector assembly, respectively, are connected by releasable fasteners and/or a weld. In some embodiments, a seal is disposed between the rearward and forward connecting edges of the driver compartment module and the inter-modular fairing connector assembly and a portion of the exterior interface of the rearward edge and the forward edge is hidden by a door of the driver compartment module. In a particularly preferred embodiment, when the door is closed, a seal between the rearward edge, the forward edge and the door is formed.

In some versions, the invention comprises an inter-modular fairing connector assembly and a sleeper module. The inter-modular fairing connector assembly connects the driver compartment module to the sleeper compartment module. In some embodiments, the sleeper compartment module has an external width greater than that of the driver compartment module and the inter-modular fairing connector has a forward connecting edge connected to the driver compartment module and a rearward connecting edge connected to the sleeper compartment module.

In some versions, the rearward connecting edge of the inter-modular fairing connector has an acute angled flange relative to a long axis of the tractor for complementarily mating with the forward connecting edge of the sleeper compartment module. In some embodiments, the inter-modular fairing connector assembly has a flared exterior surface for reducing drag between the driver compartment module and the sleeper compartment module. Still further, in some embodiments a roof module covers the driver compartment module, the inter-modular fairing connector assembly and the sleeper compartment module. Further still, in some embodiments the invention comprises a day compartment module and a roof module wherein the roof module covers the driver compartment module and the day compartment module.

The invention also takes the form of a method for securing one of a plurality of sleeper compartment modules, each having a different width, to a driver compartment module of a semi-truck having a predetermined width. The method comprises selecting one of the plurality of sleeper compartment modules to be connected to the driver compartment module. The width of the selected sleeper compartment module is determined and an appropriate inter-modular fairing connector assembly is chosen. Each connector has a forward connecting edge and a rearward connecting edge, each with a particular width.

An appropriate connector is chosen from the plurality of inter-modular fairing connector assemblies such that the width of the forward connecting edge corresponds with the width of the driver compartment module and the rearward edge corresponds with the width of the sleeper compartment module. The forward edge of the fairing connector assembly is secured to the driver compartment module and the rearward edge of the fairing connector assembly is secured to the sleeper compartment module.

In some embodiments of the inventive method, the width of the sleeper compartment module is greater than that of the driver compartment module and the external surface of the inter-modular fairing is flared to provide a smooth aerodynamic transition between the driver compartment module and the sleeper compartment module. In some embodiments of the method, the inter-modular fairing connects to a portion of a B-post of the driver compartment module. In some embodiments of the method, the B-post includes an acutely angled flange portion (relative to a long axis of the tractor) for receiving a complementarily disposed angled portion of the forward edge of the inter-modular fairing. In some versions of the inventive method, the rearward edge of the inter-modular fairing includes an acutely angled flange portion (relative to a long axis of the tractor) for receiving a complementarily disposed angled portion of the forward edge of the sleeper compartment module. In some embodiments of the method, the inter-modular fairing is secured to the driver compartment module and the sleeper compartment module with releasable fasteners and/or a weld.

BRIEF DESCRIPTION OF THE DRAWINGS

The present invention will now be more fully described, by way of example, with reference to the accompanying drawings in which.

DETAILED DESCRIPTION

Figure 1A:
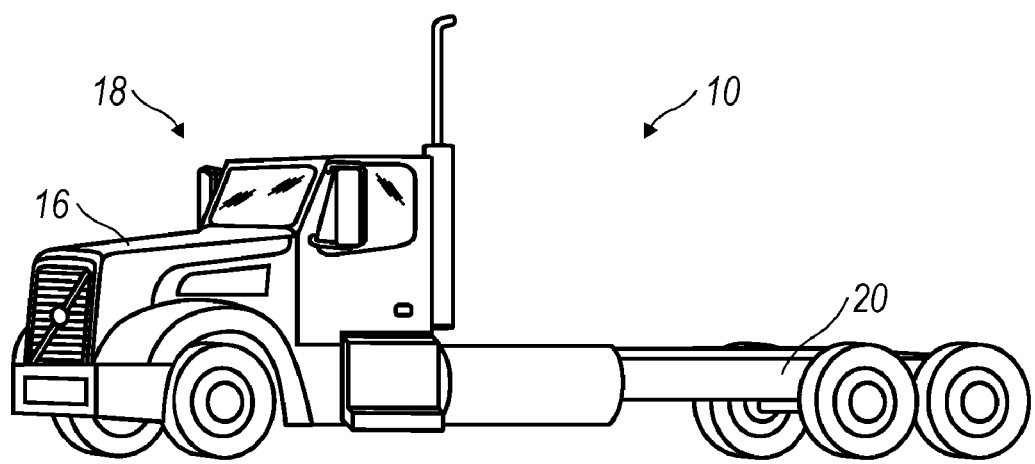
FIG. 1A is a perspective view of a currently available semi-truck in a day cab configuration.

The present invention will now be described and disclosed in greater detail. It is to be understood, however, that the disclosed embodiments are merely exemplary of the invention and that the invention may be embodied in various and alternative forms. It should also be understood that the accompanying figures are not necessarily to scale and some features may be exaggerated, or minimized, to show details of particular components. Therefore, specific structural and functional details disclosed herein are not to be interpreted as limiting the scope of the claims, but are merely provided as an example to teach one having ordinary skill in the art to make and use the invention. It should also be appreciated that in the following detailed description, like reference numerals on different drawing views are intended to identify like structural elements. The phrase "sleeper cab" may be used to refer to both an actual sleeper compartment of a semi-truck, as well as a semi-truck having a sleeper compartment connected thereto. The terms tractor, truck, semi-truck and the like are intended to refer to the tractor portion of a tractor-trailer type truck.

Figure 1B:
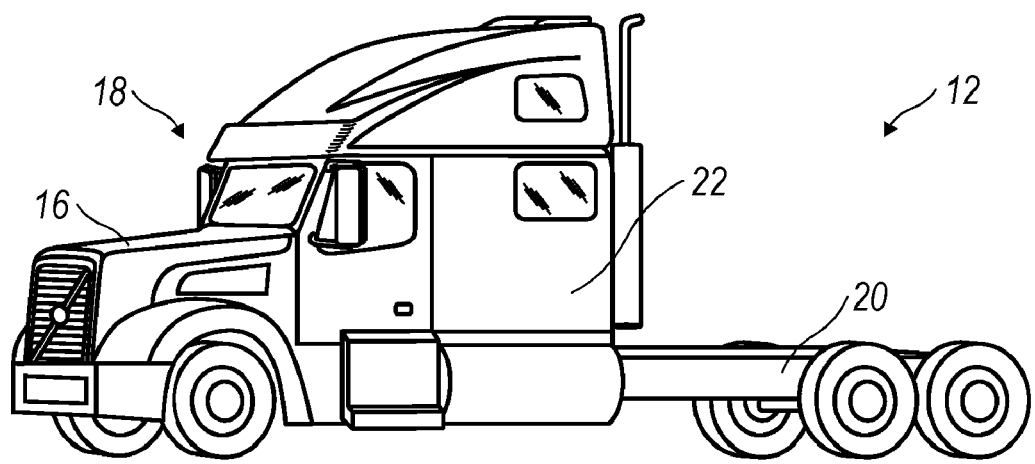
FIG. 1B is a perspective view of a currently available semi-truck with an integral sleeper compartment configuration.
Figure 1C:
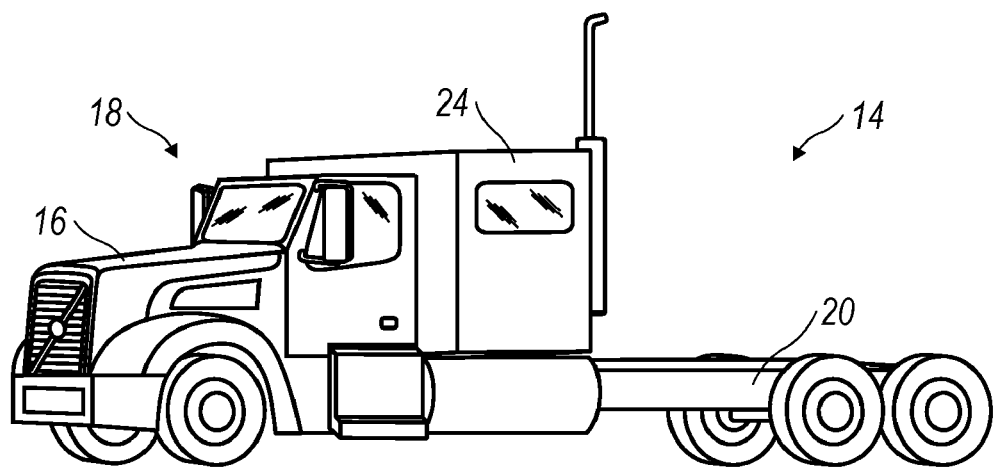
FIG. 1C is a perspective view of a currently available semi-truck with a separate sleeper compartment module, which has a width greater than the driver compartment.

Referring now to the drawings, FIGS. 1A–1C illustrate semi-trucks in day cab 10, integral sleeper cab 12 and modular sleeper cab 14 configurations, respectively. Each of the cab configurations (10, 12, 14) comprises a hood 16, a driver compartment 18, and a trailer-receiving area 20. The sleeper cab 12 configuration of FIG. 1B includes an integral sleeper compartment 22 and the modular sleeper cab 14 configuration of FIG. 1C has a separable modular sleeper compartment 24. As previously discussed, day cab 10 configurations (FIG. 1A) are generally utilized for performing local deliveries that are completed in a day. Consequently, day cab configurations 10 do not have a sleeper compartment.

Integral and modular sleeper cabs are each employed upon semi-trucks used for transporting cargo over long distances. The integral sleeper cab 12 of FIG. 1B is rigidly connected with the driver compartment 18 by common frame components. Consequently, it is difficult to convert integral-type sleeper cabs 12 into day cabs. As shown in FIG. 1C, while the separable modular sleeper cab 14 may be more easily modified into a day cab configuration, access between the driver compartment 18 and the sleeper compartment 24 can be restricted. Additionally, because the separable modular sleeper compartment 24 often has an exterior width and height that is greater than that of the driver compartment 18, the exterior interface between the driver compartment and the modular sleeper cabin is not as aerodynamic as an integral sleeper cab. Additionally, the interconnection between the driver compartment 18 and the separable modular sleeper compartment 24 is not as solid because the sleeper compartment is not formed from the same structural framework as the driver compartment. Thus, the separable modular sleeper cab 14 has a tendency to experience increased vibration and road noise when compared with that of the integral sleeper cab configuration 12.

Concepts and characterizing features of the present invention are exemplified in FIGS. 2–5. Referring to FIGS. 2A–2C, a semi-truck 30 according to the present invention is shown in a day cab configuration 32, a sleeper cab configuration 34, and a wide sleeper cab configuration 36, respectively. Each of the several semi-truck 30 variations of FIGS. 2A–2C includes a hood 38, a driver compartment 40, and a trailer-receiving area 42.

Figure 2A:
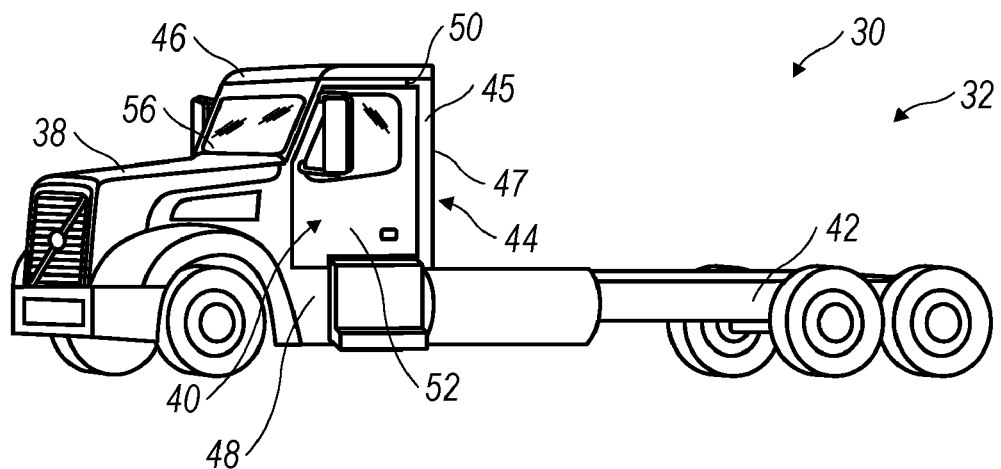
FIG. 2A is a perspective view of a day cab configuration of a semi-truck configured according to the present invention.

In the day cab configuration 32 of FIG. 2A (also see FIG. 4A for greater detail), the semi-truck 30 includes a day cab module 44 and a day cab roof module 46. The day cab module 44 is generally provided for forming the rear wall of the driver compartment 40. In the embodiment illustrated, the day cab module 44 broadly comprises a pair of side walls 45 and a rear wall 47. The side walls 45 of the day cab module 44 secure to side walls 48 of the driver compartment such that the rear wall 47 of the day cab module 44 is generally disposed behind the driver and passenger seats of the truck. Basically, the day cab module 44 acts as a cap over the large opening in the backside of the driver compartment 40 that otherwise enables occupant access to a rear-mounted sleeper cab when installed.

The side walls 48 of the driver compartment 40 and the side walls 45 of the day cab module comprise complementarily angled surfaces configured to engage one another in a face-to-face orientation. The use of such complementary angled surfaces is an important feature of several of the presently disclosed inventive arrangements. In its most frequent implementation, the concept is to provide terminal end surfaces of two abutting wall sections of interconnected compartment walls with complementarily angled surfaces as exemplified in FIG. 3A where details of one such wall-to-wall interconnection is exemplified in cross-section. As will be appreciated from additional descriptions that are also later included, the same concept can be used for providing an adjustable interface connection between compartment wall-ends and an inter-modular flared fairing connector (FIG. 3E) or between peripheral edges of a roof module and top wall edges of the driver and sleeper compartments which the roof covers.

Returning to FIG. 3A, an exploded view is shown of a portion of a driver compartment wall 48 that backwardly terminates in a bent flange 78. A forwardly directed wall-end surface of an abbreviated day cab module 44 is positioned to be moved into engagement with the bent flange 78 of the driver compartment wall 48. Because the two wall-end portions can nest, or conformance-fit with one another when mated together, the relationship is described herein as complementary.

Figure 3A:
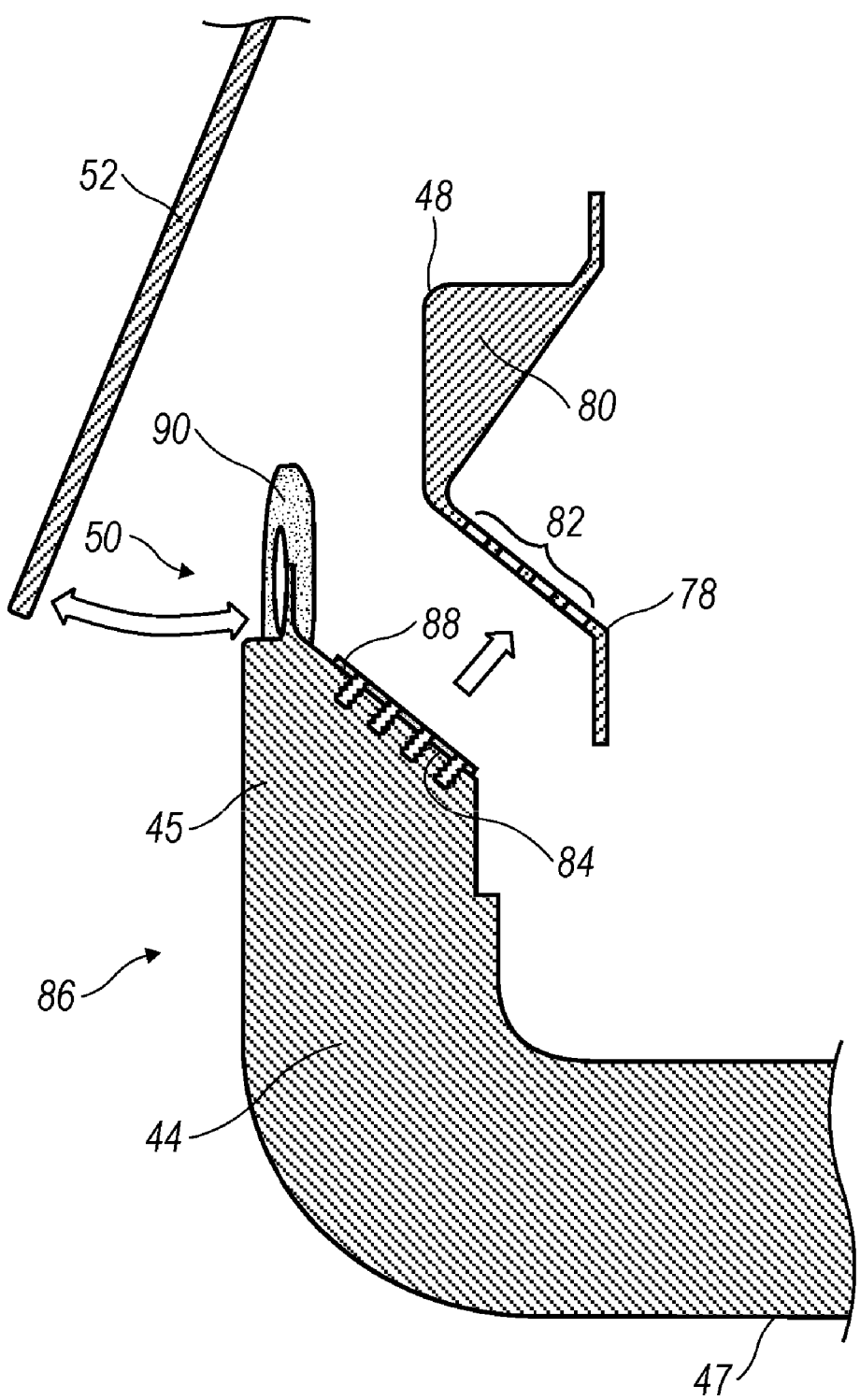
FIG. 3A is an exploded cross-sectional view of an exemplary interface between a driver compartment and day cab, with the door of the driver compartment slightly open away from a sealing gasket carried on the forward-most edge of the day cab.
Figure 3B:
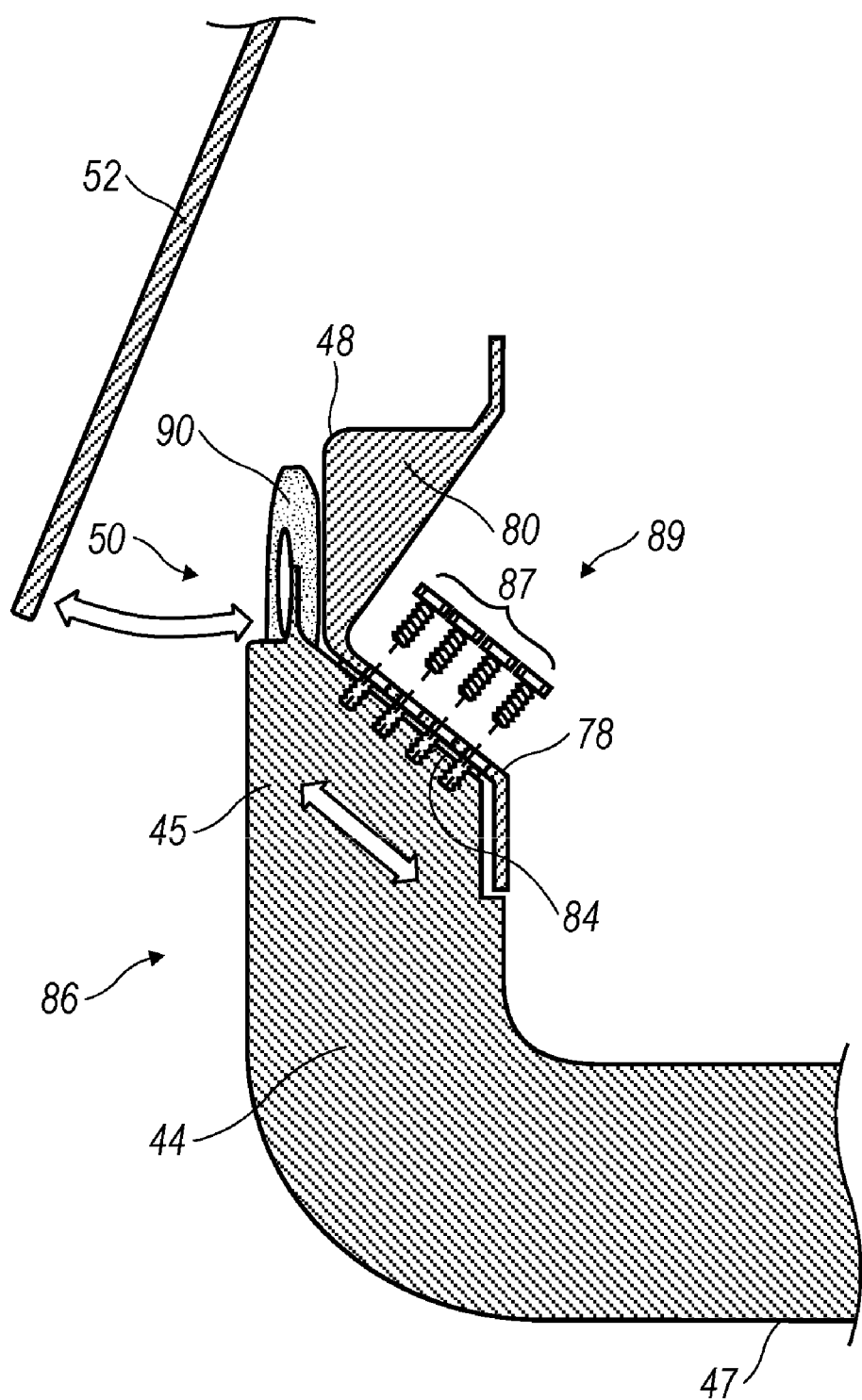
FIG. 3B is a partially assembled, cross-sectional view showing matable flanges of the driver compartment and day cab of FIG. 3A in abutting, slidable, face-to-face engagement with one another, but not yet completely aligned with each other.
Figure 3C:
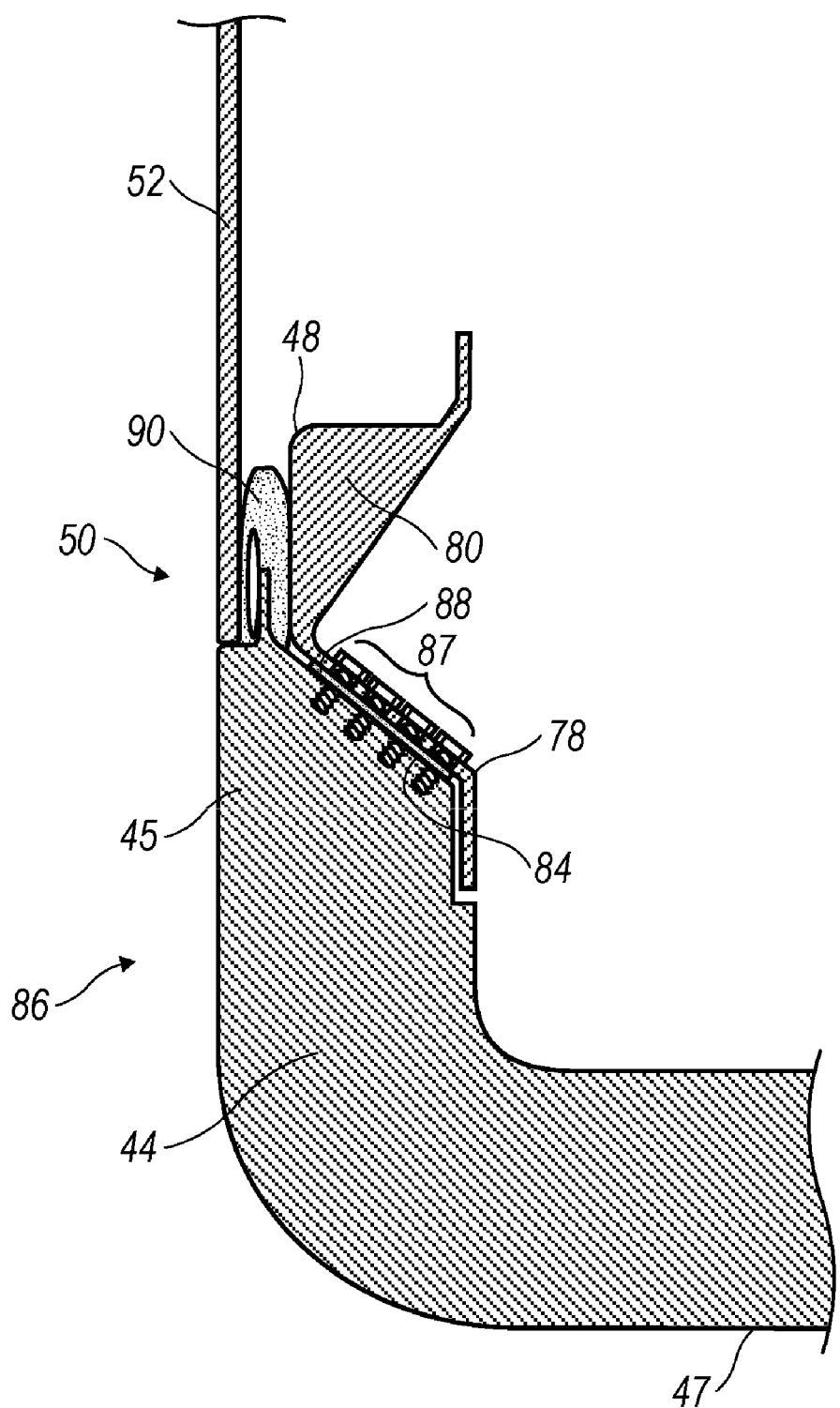
FIG. 3C is a fully assembled, cross-sectional view showing the flanges of the driver compartment and day cab of FIGS. 3A and 3B in adjusted and fixed engagement with one another.
Figure 3D:
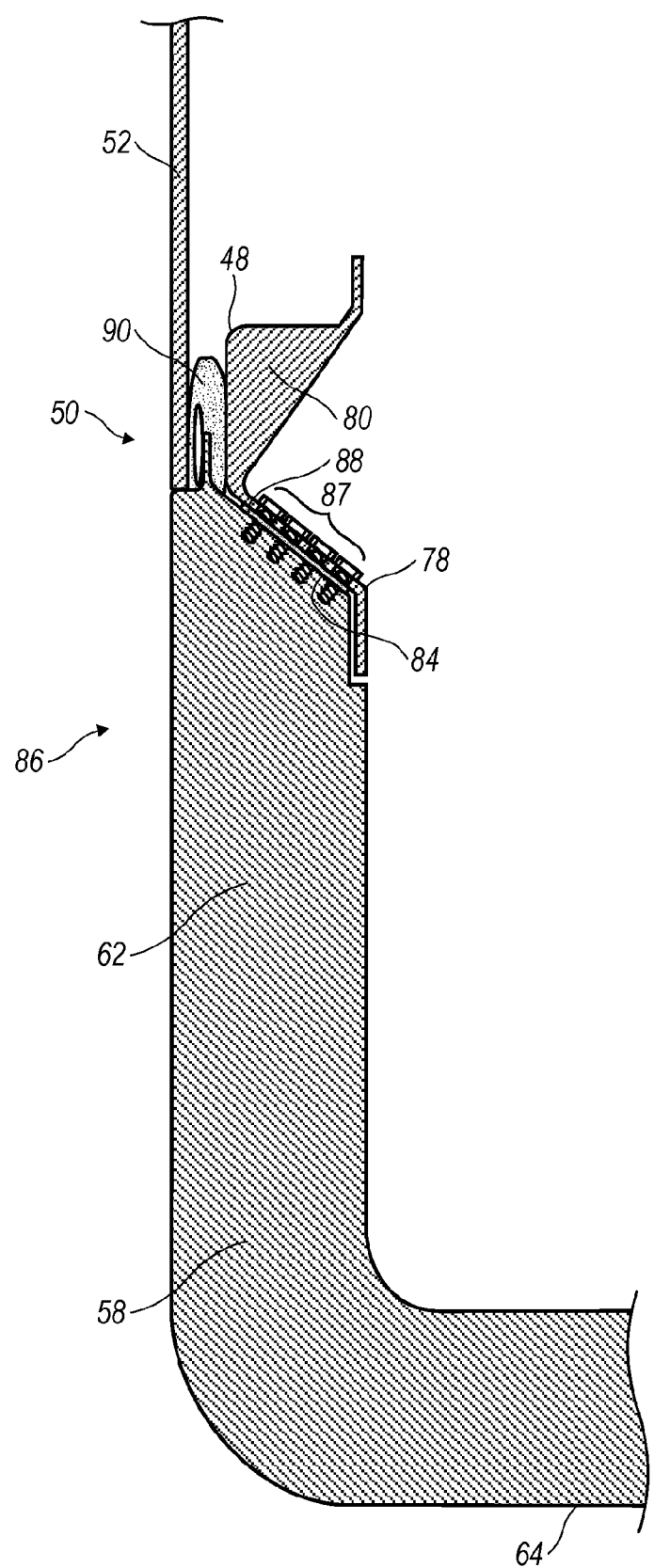
FIG. 3D is a fully assembled, cross-sectional view showing inclined, engagement flanges of a driver compartment and a sleeper cab in adjusted and fixed engagement with one another.

Among other reasons, the large size of the two compartments (driver's cab 18, and for example, a rear-mount sleeper cab 22) that are being joined, and variations in their manufacture, often result in something less than perfect alignment between the end-wall surfaces when the compartments are brought together for interconnection as shown in FIG. 3B. For this reason, one of the angled wall ends (the driver compartment wall 48 in the illustration) is exemplarily provided with through slots 82 that act as means for allowing adjustable positioning of one wall with respect to the other before being fixed together using fasteners (exemplified as threaded bolts 87 in the illustration).

In a first situation, the imperfect alignment is merely accommodated and the two wall ends are fastened together, albeit slightly offset from a perfectly mated fit, and as is depicted in FIG. 3B. The inclined or angled surfaces of the two wall ends, however, also accommodate relative sliding of the two engaged surfaces, one upon the other. The most likely situation in the illustrated example is that the position of the sleeper cab 44 is adjusted relative to the driver's cab 40 until a "best fit" is achieved between the two cabin modules and the fasteners (bolts 87, for example) are tightened down. Another possibility is that the wall 45 of the sleeper cab 44 is slightly flexible. In that case the wall 45 can be biased from the misaligned orientation of FIG. 3B into the properly mated orientation of FIG. 3C, in accordance with the double-headed arrow of FIG. 3B, and then fastened down. Again, such fixation is exemplified in FIG. 3C where the bolts 87 have been screwed down tight, and the walls 45, 48 are fixed together.

Figure 4A:
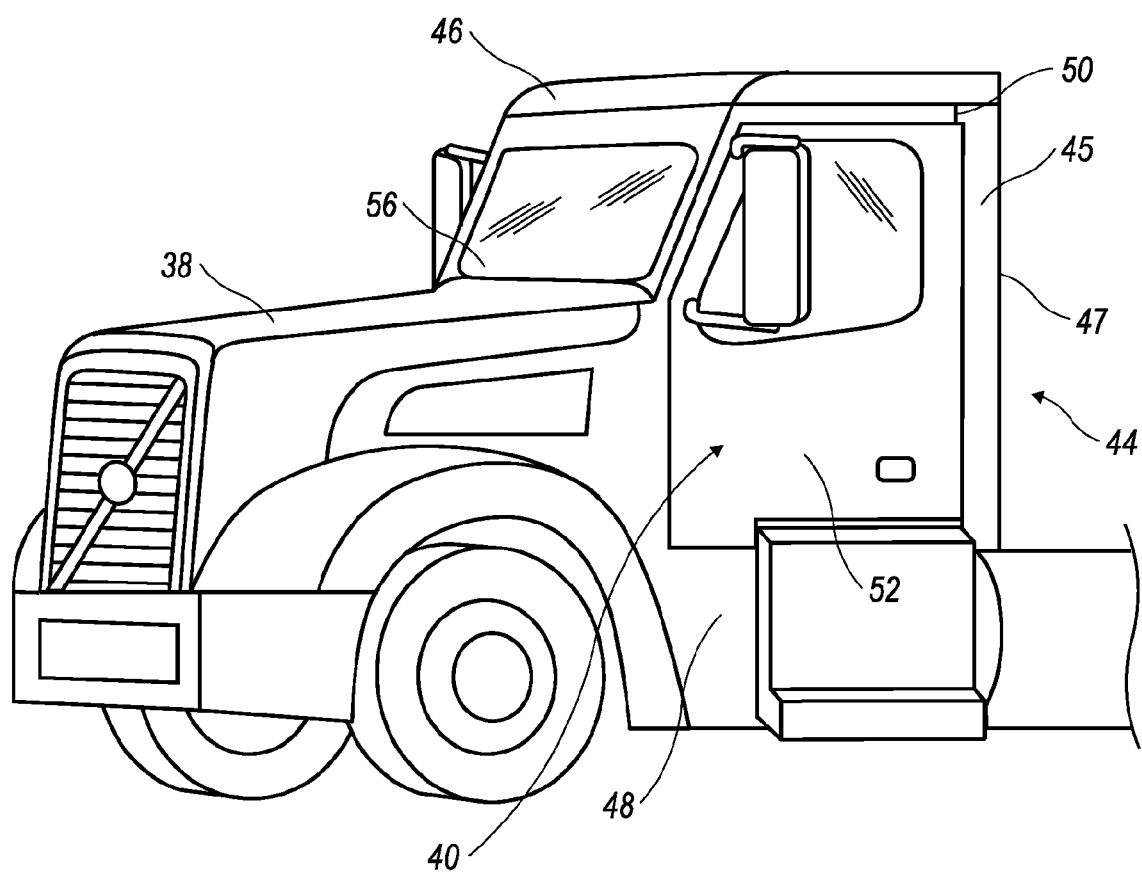
FIG. 4A is a partial perspective view of a semi-truck configured according to the present invention comprising a day cab configuration with a driver compartment door that is in a closed position to illustrate the fact that the exterior joint of the interface between the driver compartment and the back-cab compartment module is hidden behind the closed door.

Returning to the preferred embodiment of FIGS. 2A and 4A, a day cab roof module 46 generally extends from a location proximate the top of the windshield 56 to the rear wall 47 of the day cab module 44. The top exterior surface of the day cab roof module 46 preferably has a smooth, generally elevated and arced aerodynamic surface for reducing vehicle drag. A periphery of the day cab roof module 46 is provided at an edge thereof with a downwardly directed inclined surface (similar to that described above with respect to the inclined or angled end-wall treatments of FIGS. 3A–3C) for mating engagement with complementary inclined surface(s) positioned at top edges of walls of the driver's cab. The day cab roof module 46 can then be secured upon the driver compartment 40 and day cab module 44, forming a sort of cap thereover.

Figure 2B:
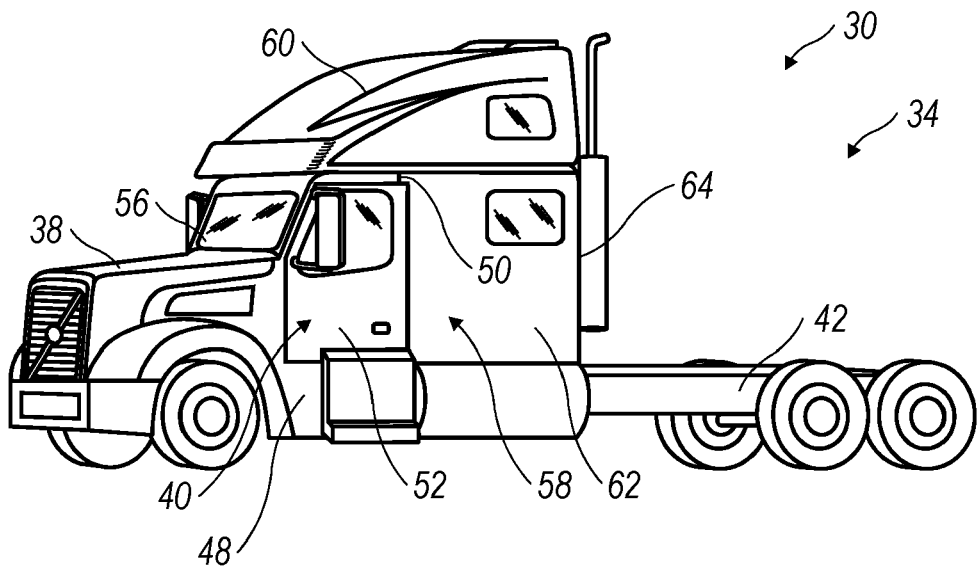
FIG. 2B is a perspective view of a semi-truck configured according to the present invention and comprising a sleeper compartment module having a width equal to that of the driver compartment module.

In the sleeper cab configuration 34 of FIG. 2B, the semi-truck 30 is seen as further comprising a sleeper cab module 58 and a sleeper cab roof module 60. In the embodiment illustrated, the sleeper cab module 58 broadly comprises a pair of side walls 62 and a rear wall 64 having a width that generally corresponds with the width of the driver compartment 40. The side walls 62 of the sleeper cab module 58 are secured to the side walls 48 of the driver compartment as shown in detail in FIG. 3D. There, the exposed surficial joint between the side walls 48, 62 is substantially hidden behind the closed driver door 52 thereby lending an aesthetically pleasing appearance to the side of the truck cab.

Figure 5A:
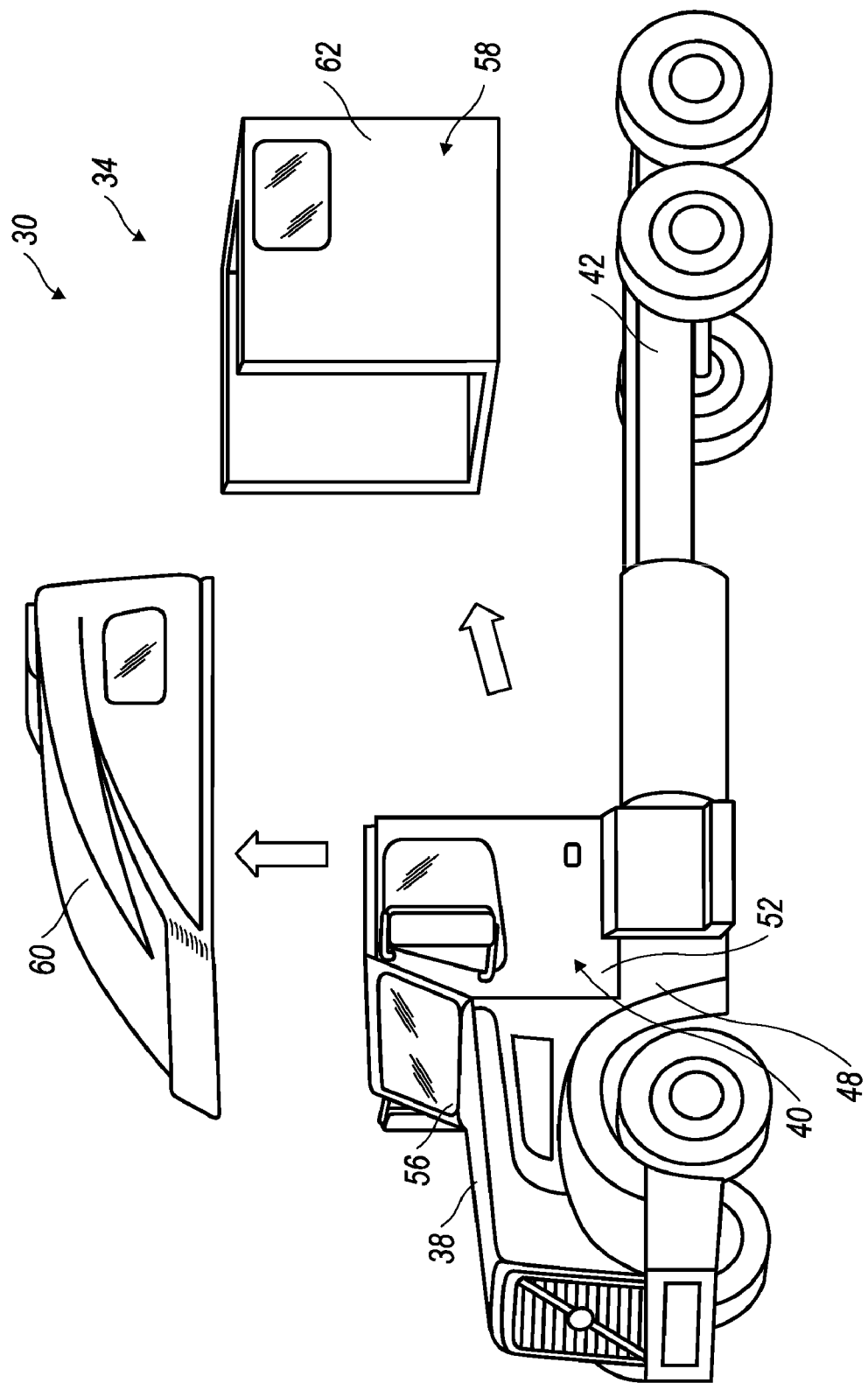
FIGS. 5A–5C are exploded perspective views illustrating the conversion of each of a semi-truck with a similar-width sleeper cab (FIG. 5A) and a semi-truck with a wider-width sleeper cab utilizing an inter-modular fairing connector assembly (FIG. 5B) to a day cab configuration (FIG. 5C)

As depicted in FIGS. 2B and 5A, the sleeper cab roof module 60 generally extends from a location proximate the top of the windshield 56 to the rear wall 64 of the sleeper cab module 58. The top exterior surface of the sleeper cab roof module 60 preferably has a smooth, generally elevated and arced aerodynamic surface for reducing vehicle drag. The sleeper cab roof module 60 fits on top of the compartment walls 48, 62, and 64 in a cap-like manner and can be fastened thereto utilizing the previously described inclined or angled-surface method.

Figure 2C:
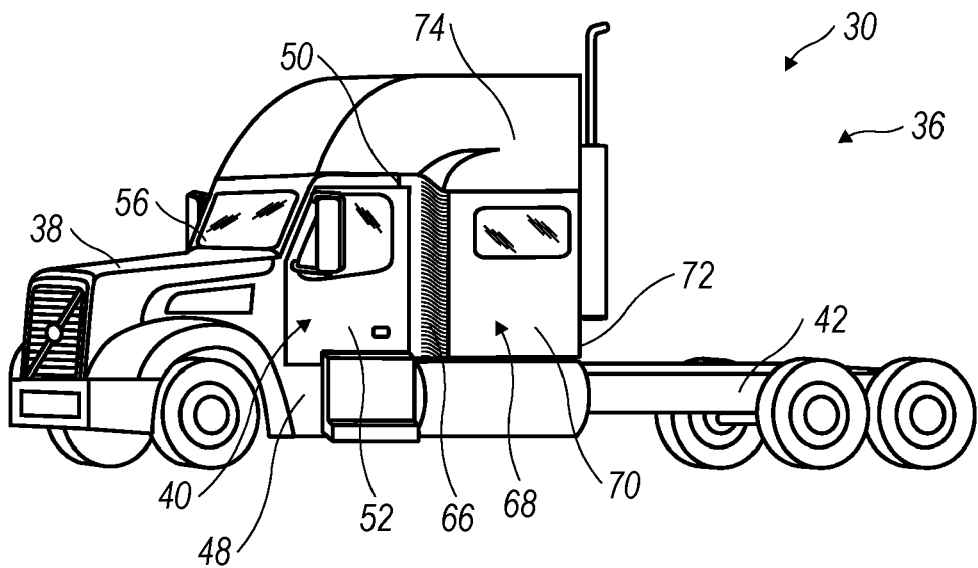
FIG. 2C is a perspective view of a semi-truck configured according to the present invention comprising a sleeper compartment module having a width greater than that of the driver compartment module with an inter-modular fairing connector assembly located therebetween.
Figure 3E:
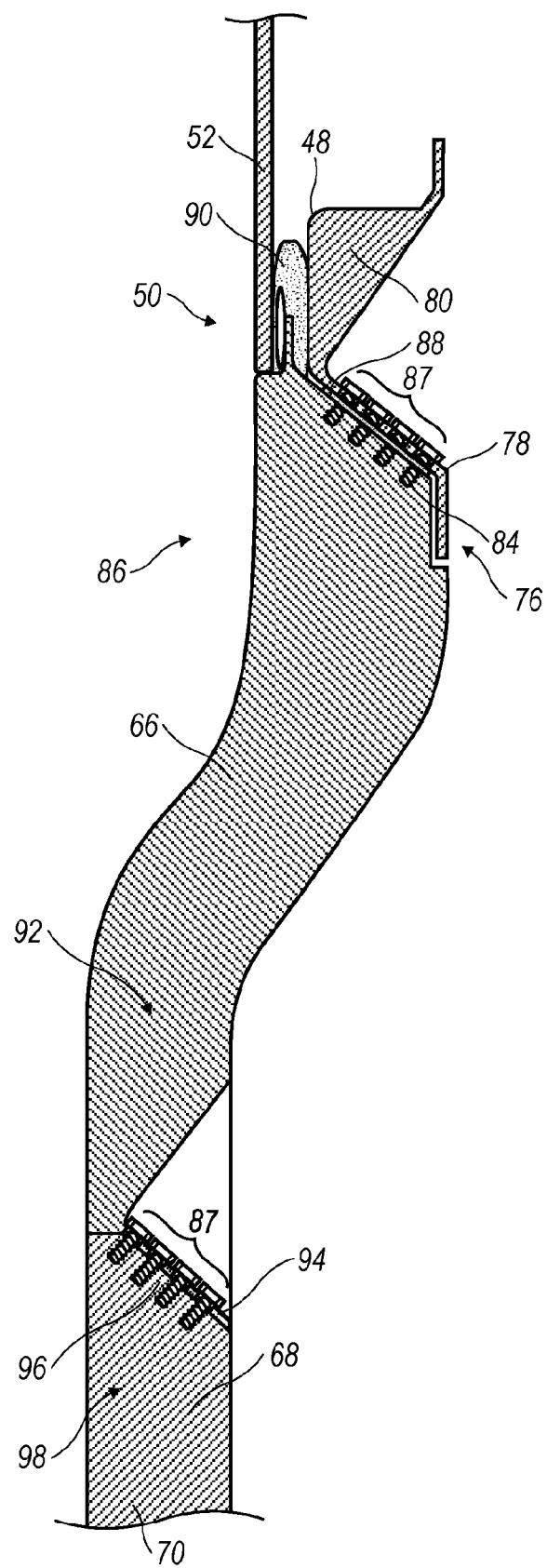
FIG. 3E is a fully assembled, cross-sectional view showing inclined, engagement flanges of a driver compartment and a sleeper cab in adjusted and fixed engagement with respect to one another, via a flared inter-modular connector.
Figure 4B:
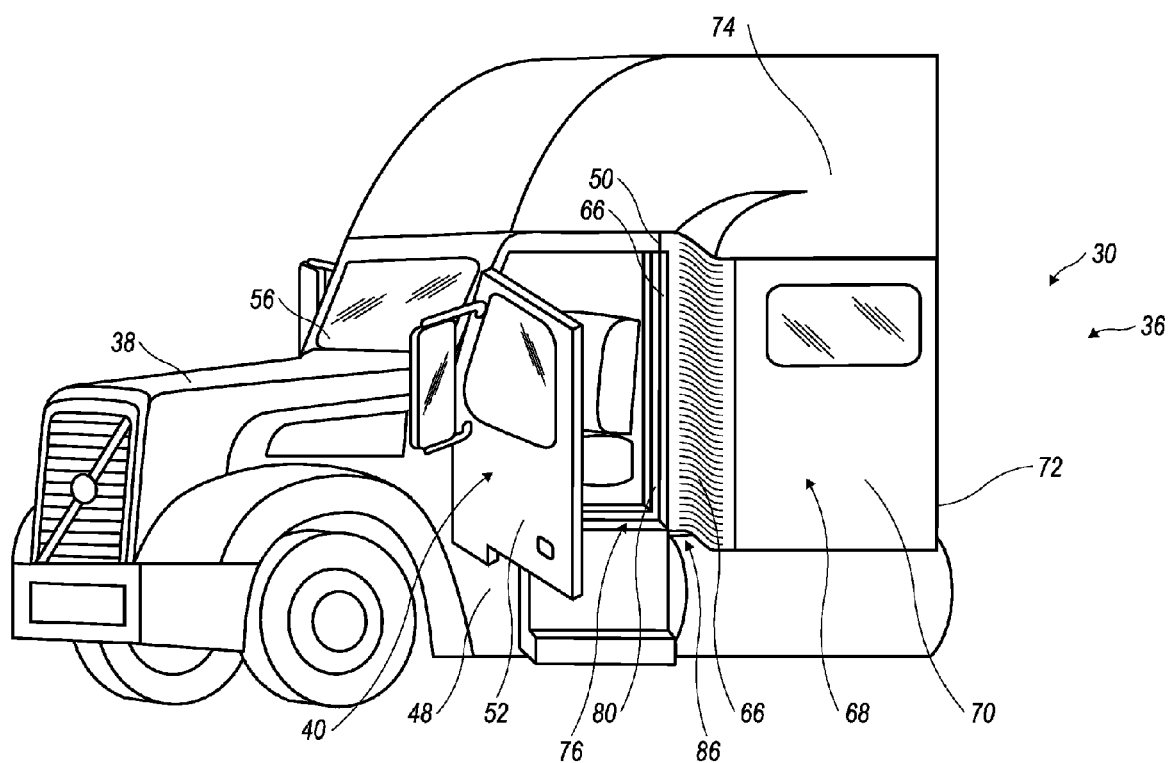
FIG. 4B is a partial perspective view of the semi-truck of FIG. 4A with the driver compartment door open revealing the exterior joint between the driver compartment and the wide sleeper cab module which is preferably obscured from view when the driver compartment door is closed as in FIG. 4A.

In the wide-width sleeper cab configuration 36 of FIGS. 2C and 4B, the semi-truck 30 is seen as comprising an inter-modular fairing connector assembly 66, a wide sleeper cab module 68 and a flared sleeper cab roof module 74. In the embodiment illustrated, the wide sleeper cab module 68 broadly comprises a pair of side walls 70 and a rear wall 72, which has a width that is greater than the width of the driver compartment 40. The end-edges of side walls 48 of the driver compartment are configured with inclined or angled surfaces as described in greater detail hereinabove to mate with a forward connecting edge of inter-modular fairing connector assembly 66 (FIG. 3E). Rearward angled edges of the inter-modular fairing connector assembly 66 are configured to abut forward angled connecting edges of the wide sleeper cab module 68. Lateral portions or members 66a of the inter-modular connecting member 66, thus, are flared from front to back such that their forward connecting edges complementarily mate with the driver compartment and rearward connecting edges complementarily mate with the wider sleeping compartment 68.

The lateral exterior side surfaces of the inter-modular fairing connector assembly 66 preferably have a front-to-back (with respect to a long axis of the semi-truck 30), smooth and generally outwardly flared and arced aerodynamic surface. As described above, the exteriorly exposed joints 50 of the inter-modular fairing connector assembly 66 and the side walls 48 of the driver compartment 40 are respectively hidden behind the driver and passenger doors for aesthetic reasons, including giving the appearance that the wide sleeper cab module 68 is integrally constructed with the driver compartment. The rearward connecting edges of the inter-modular fairing connector assemblies 66 and the side walls 70 of the wide sleeper cab module also comprise complementarily angled surfaces according to the teachings above.

The flared sleeper cab roof module 74 generally extends from the top of the windshield 56 to the rear wall 72 of the wide sleeper cab module 74 to cover both the driver compartment and the sleeping compartment. The top exterior surface of the flared sleeper cab roof module 74 preferably has a smooth, generally elevated and arced aerodynamic surface for reducing vehicle drag. Peripheral under-edges of the roof module 74 and top wall edges of the driver and sleeper compartments which the roof 74 covers are provided with complementarily angled mating surfaces as described hereinabove. Generally, in the wide sleeper cab configuration, the rearward opening of the driver compartment is open to the inter-module connectors 66 and the rearward opening of the inter-module connectors 66 is open to the forward opening of the wide sleeper cab module. Consequently, access between the driver compartment, the inter-module connectors and the wide sleeper cab module is relatively unobstructed and unrestricted.

As previously discussed, FIGS. 3A–3E depict interface arrangements, also referred to as interfaces 50, between a driver compartment and alternatively a day cab module 44 (FIGS. 3A–3C), a sleeper cab module 58 (FIG. 3D), and an inter-modular fairing connector assembly 66 (FIG. 3E). The interface 50 is generally provided for accomplishing a transition of a semi-truck between sleeper cab and day cab configurations. The interface is also provided for allowing a number of differently sized modules (day cab, sleeper cab) to be attached to the driver compartment and aligned and adjusted to provide a factory appearance. Interface 50 is also provided, and disposed, such that the connected modules appear to be integrally formed with the driver compartment.

The interface arrangement 50 broadly comprises driver compartment rear connecting edge 76 exemplarily comprising an acutely angled flange 78 (relative to a long axis of the tractor) extending from B-post 80. B-post 80 may also be referred to as a door post and generally comprises a frame member of the side walls 48. Angled flange 78 can include one or more of the elongate slots 82 provided for insertibly receiving fasteners such as threaded bolts 87. The angled flange 78 defines a space 89 (FIG. 3B) which provides access for assembly tools and the like so that the modules can be easily attached and removed. An angled portion 84 of a forward connecting edge 86 of whichever one of the cab modules 44, 58 or the inter-modular fairing connector assembly 66 is provided for complementarily mating with the angled flange 78.

A seal 88 is disposed between the angled flange 78 and the angled portion 84 as a moisture and particulate barrier. A door seal 90 forms a seal between the rearward connecting edge of the driver compartment and the forward connecting edge of either the cab module 44, 58 or the inter-modular fairing connector assembly 66 when the driver compartment doors 52 are closed.

The detailed illustration of FIG. 3E demonstrates that the rearward connecting edge 92 of the inter-modular fairing connector assembly comprises an acutely angled flange 94 (relative to a long axis of the tractor) extending therefrom for receiving an angled portion 96 of a forward connecting edge 98 of a sleeper cab module. The angled flange 94 also allows modules being attached to the inter-modular fairing connector assembly 66 to slide along its face such that the modules may be readily aligned and adjusted. The angled flange 94 forms a working space similar to the space 89 established by flange 78 for installation tools during assembly. The angled flange 94 can also comprise one or more elongate slots for receiving fasteners such as threaded bolts.

Figure 5B:
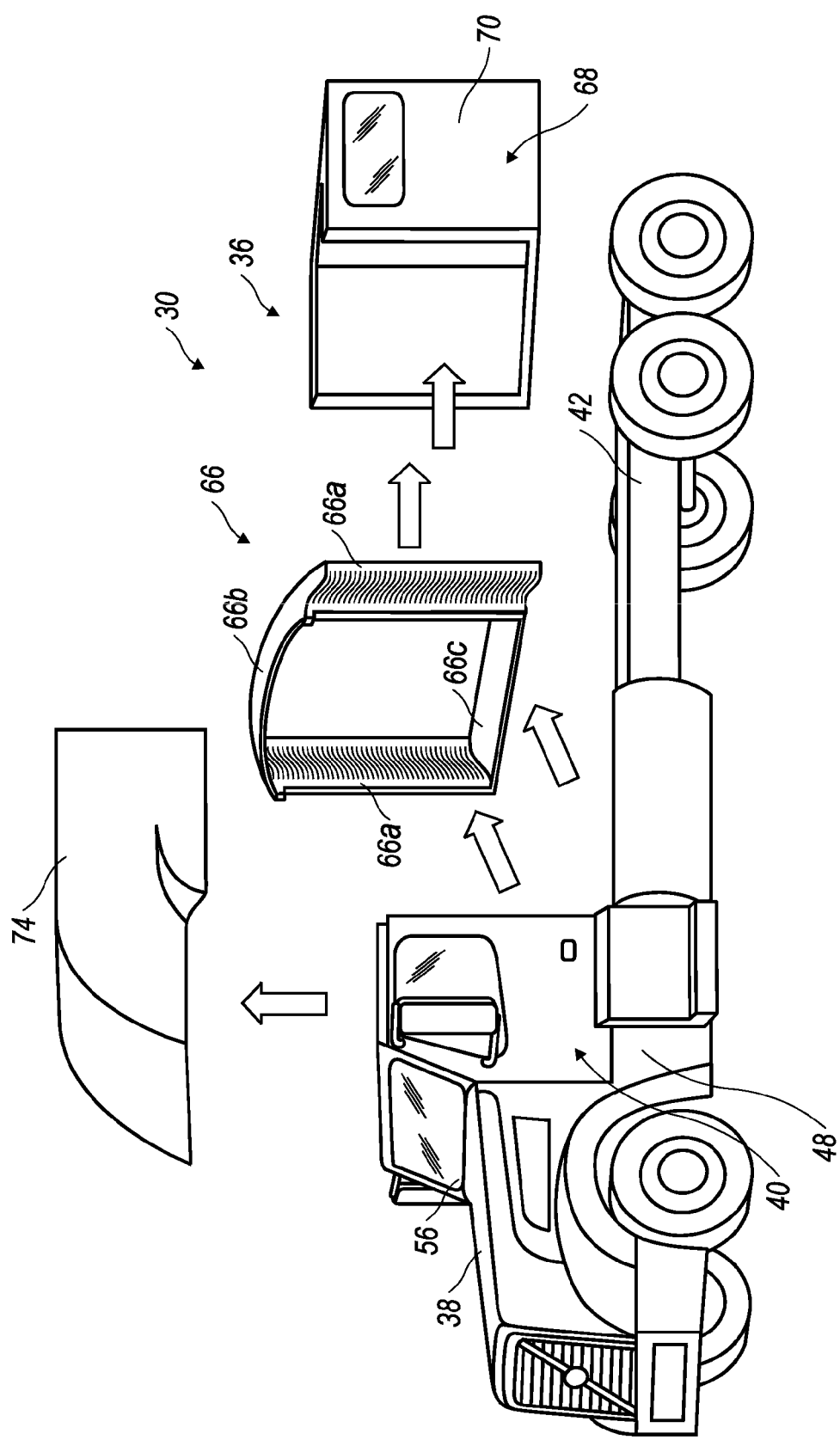
Figure 5C:
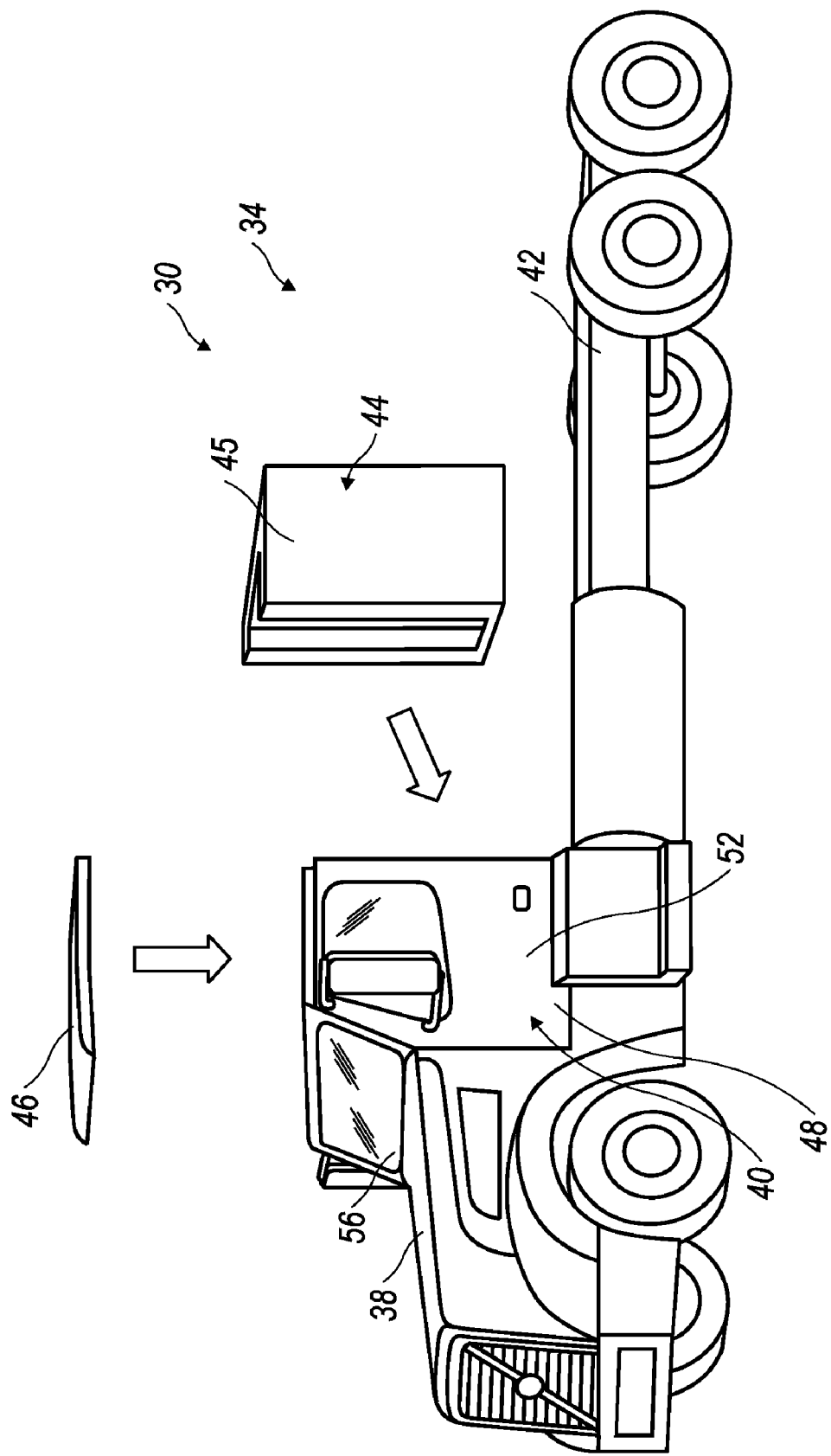
Figure 8A:
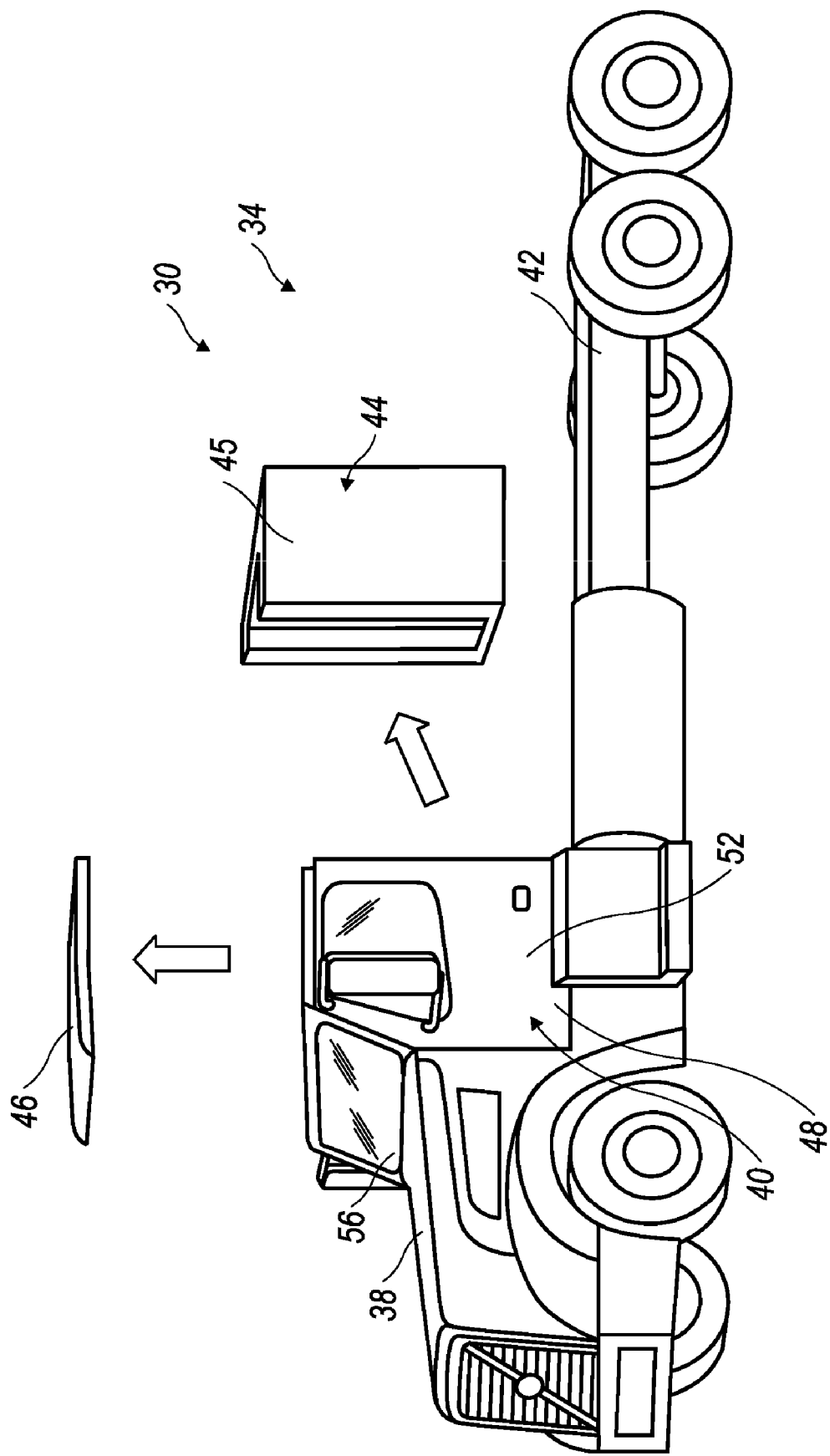
FIGS. 8A–8B are exploded perspective views illustrating conversion from a day cab configuration (FIG. 8A) to a semi-truck with a wider-width sleeper cab (FIG. 8B).
Figure 8B:
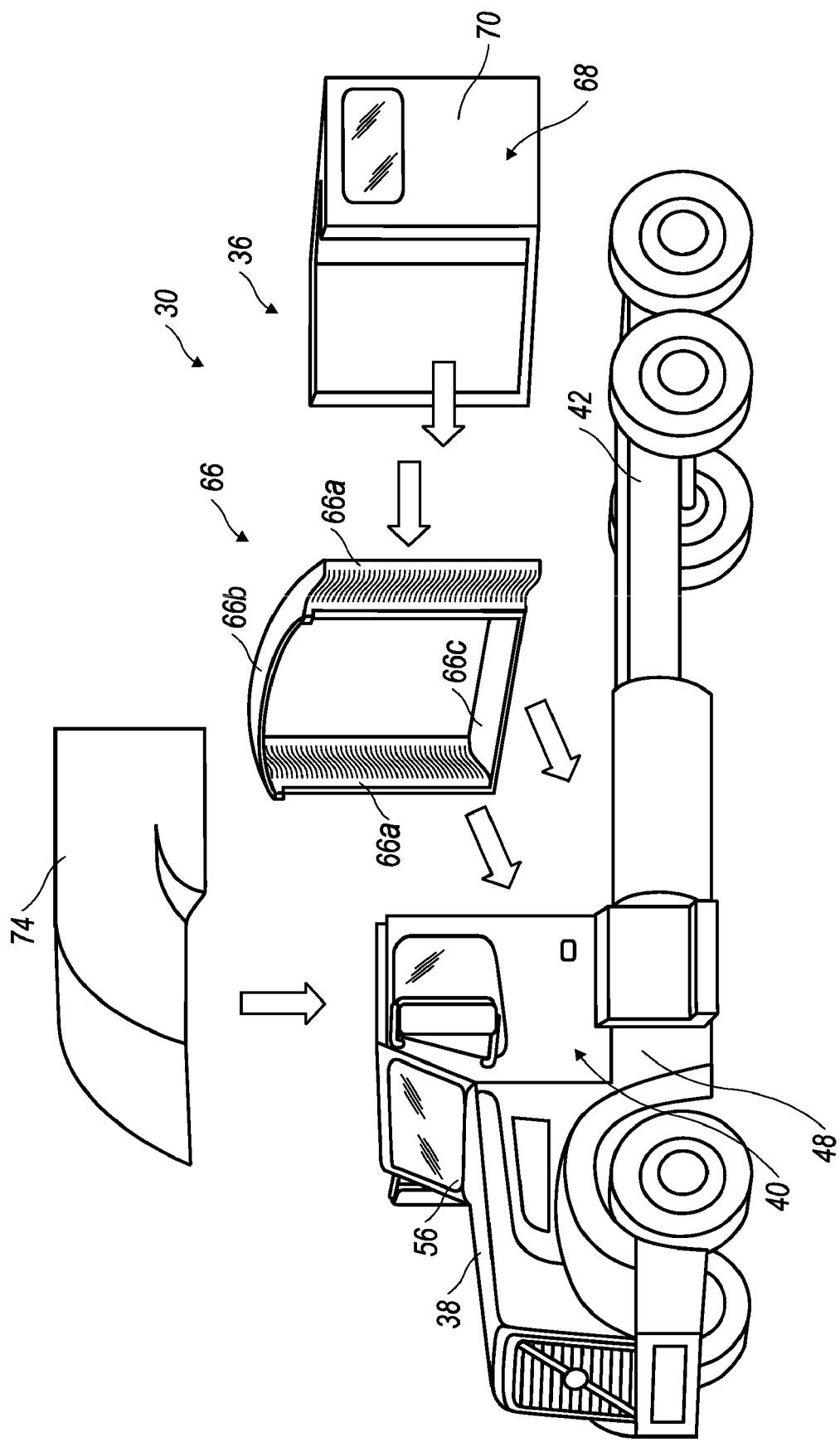

Referring now to FIGS. 5A–5C, the process according to the present invention by which a semi-truck may be advantageously converted from a sleeper cab configuration to a day cab configuration is illustrated. As demonstrated by FIG. 5A, removal of a sleeper cab module 58 may be accomplished by disengaging the fastener assemblies securing the sleeper cab roof module 60 to the driver compartment 40 and sleeper cab module 58. Thereafter, the sleeper cab roof module 60 is removed. Once the sleeper cab roof module 60 has been removed, the sleeper cab module 58 is then also taken away. Then, and as illustrated in FIG. 5C, a day cab module 44 can be moved into place and mated with the side walls of the driver compartment module 40 and a day cab roof module 46 secured thereon. Alternatively, and as illustrated in FIG. 5B (see FIG. 4B for an assembled, non-exploded configuration), removal of a wide sleeper cab module 68 may be accomplished by removing the fastener assemblies securing the flared sleeper cab roof module 74 to the driver compartment 40, inter-module connectors 66 and wide sleeper cab module 68. Thereafter, the flared sleeper cab roof module 74 is removed. Once the flared sleeper cab roof module 74 has been removed, the inter-module connectors 66 and wide sleeper cab module 68 may then be taken away in a similar manner as described immediately above. Then, and again as illustrated in FIG. 5C, day cab module 44 can be moved into place and mated with the side walls 48 of the driver compartment module 40 and a day cab roof module 46 secured thereon. A reverse conversion from a day cab configuration to a sleeper cab configuration is depicted in FIGS. 8A to 8B which constitutes yet another alternative embodiment of the presently disclosed invention(s).

Figure 6:
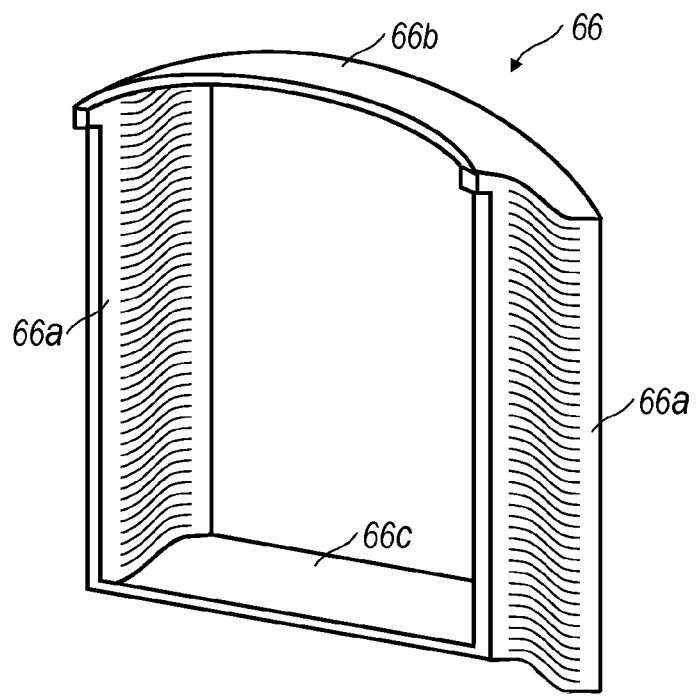
FIG. 6 is a perspective view of the inter-modular fairing connector assembly of FIG. 5B.
Figure 7:
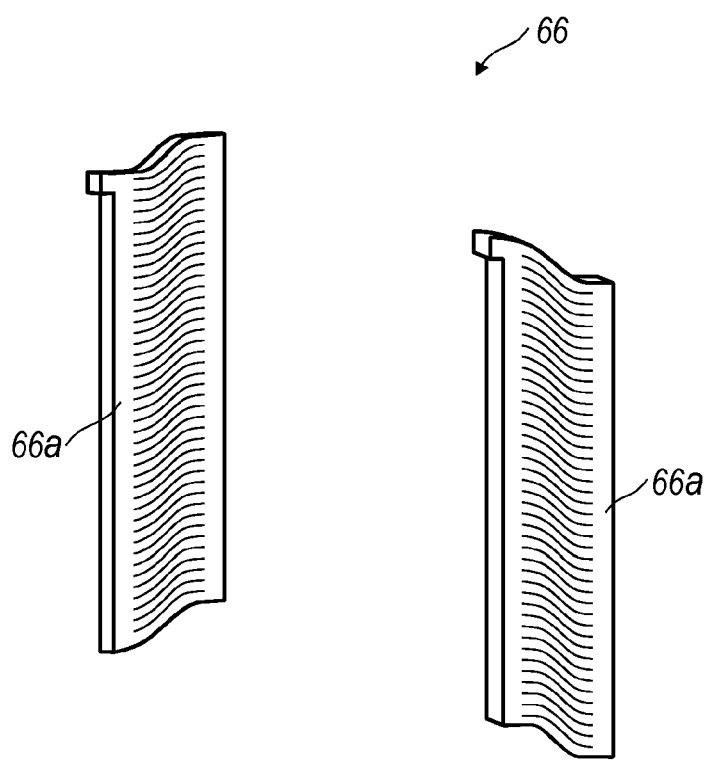
FIG. 7 is a perspective view of an alternative embodiment of an inter-modular fairing connector assembly comprising a pair of side panel pieces.

FIGS. 6 and 7 show alternative configurations for interconnecting flared, fairing assemblies or adaptors 66. In FIG. 6, the flared fairing 66 is generally formed as a predominantly squared ring. The two lateral sides 66a are flared from front to back, while the interconnecting top bridge 66b is generally arch-shaped and configured to fit underneath the flared roof module 74 (FIG. 5B). The lower section 66c of the adaptor 66 is substantially flat and provides a floor spanning from the driver compartment to the sleeper compartment when the adaptor 66 is connected therebetween.

In an alternative configuration, the adaptor 66 is constituted by a pair of independent lateral flared fairings 66a as depicted in FIG. 7. Top ends of these fairings 66a can be interconnected by an installed roof module and a floor section must be separately provided. In an alternative embodiment, a pair of lateral flared fairings 66a are joined together by an interconnecting bridge portion 66b, which is preferably arch-shaped, and thereby forms a basically inverted U-shaped adaptor 66.

As will readily be appreciated by those persons skilled in these arts, one embodiment of the present invention entails the provision (or at least an availability made) of an array of differently configured inter-modular fairing connector assemblies 66 (or sets of connectors) that can be utilized for securing differently sized sleeper cab modules to different semi-trucks. From the available array of connectors, an appropriately configured connector 66 (or set of connectors 66a) can be chosen for interconnecting a particular wider-width sleeper cab 68 to a particular driver compartment 18.

From this description it should become clear that the present invention provides methods and arrangements for readily converting a semi-truck having a sleeper compartment module into a semi-truck having a day compartment module, and though less frequent, from a day cab configuration to a sleeper cab configuration. It should be appreciated by those having ordinary skill in these arts that while the present invention has been illustrated and described in what is deemed to be the preferred embodiments, various changes and modifications may be made to the invention without departing from the spirit and scope of the invention. Therefore, it should be understood that the present invention is not limited to the particular embodiments disclosed herein.

What is claimed is:

1. A modular tractor assembly comprising:
    a driver compartment module having a width and a rearward connecting edge;
    a sleeper compartment module having a width and a forward connecting edge; and
    an inter-modular fairing connector assembly joining the driver compartment module and the sleeper compartment module, the inter-modular fairing connector assembly including a forward connecting section arranged to establish a first width corresponding to the width of the driver compartment module and configured for connection with the rearward connecting edge of the driver compartment module, a rearward connecting section arranged to establish a second width corresponding to the width of the sleeper compartment module and configured for connection with the forward connecting edge of the sleeper compartment module, said inter-modular fairing connector assembly including an intermediate portion between the forward connecting section and the rearward connecting section, the intermediate portion having a flared contour providing an aerodynamic surface from the rearward connecting edge of the driver compartment module to the forward connecting edge of the sleeper compartment module and wherein a portion of the rearward connecting edge of the driver compartment module comprises an angled flange and a portion of the forward connecting section of the inter-modular fairing connector assembly is angled to complementarily mate with the angled flange extending from the driver compartment module.

2. The modular tractor assembly of claim 1 wherein the inter-modular fairing connector assembly is configured as a predominantly square ring.

3. The modular tractor assembly of claim 2 wherein a top portion of the inter-modular fairing connector assembly is formed by an arched interconnection between two lateral, backwardly flared side portions.

4. The modular tractor assembly of claim 2 wherein a bottom portion of the inter-modular fairing connector assembly is formed by a substantially flat interconnection between two lateral, backwardly flared side portions that constitutes a floor section of the inter-modular fairing connector assembly.

5. The modular tractor assembly of claim 1 wherein the sleeper compartment module has an external width greater than that of the driver compartment module.

6. The modular tractor assembly of claim 1 wherein the inter-modular fairing connector assembly is flared such that the width of the forward connecting section is less than that of the rearward connecting section.

7. The modular tractor assembly of claim 1 wherein said angled flange extends from a B-post of the driver compartment module.

8. The modular tractor assembly of claim 1 wherein the rearward connecting edge abuttingly receives the forward connecting section which are configured to accommodate relative sliding therebetween and thereby permit an adjusted fit between the driver compartment module and the sleeper compartment module.

9. The modular tractor assembly of claim 1 wherein a seal is positioned between the rearward connecting edge and the forward connecting section.

10. The modular tractor assembly of claim 1 wherein the rearward connecting edge and forward connecting section are connected by at least one releasable fastener.

11. The modular tractor assembly of claim 1 wherein the rearward connecting edge and forward connecting section are connected by welding.

12. The modular tractor assembly of claim 1 wherein at least a portion of an exterior joint between the driver compartment module and the inter-modular fairing connector assembly is covered by a closed door of the driver compartment module.

13. The modular tractor assembly of claim 1 wherein the rearward connecting section of the inter-modular fairing connector assembly comprises an angled flange.

14. The modular tractor assembly of claim 1 wherein a portion of the forward connecting edge of the sleeper compartment module is angled to complementarily mate with the angled flange extending from the inter-module fairing.

15. The modular tractor assembly of claim 14 wherein the rearward connecting section of the inter-modular fairing connector assembly and a forward connecting edge of the sleeper compartment module are connected by a releasable fastener.

16. The modular tractor assembly of claim 14 wherein the rearward connecting section of the inter-modular fairing connector assembly and a forward connecting edge of the sleeper compartment module are connected by welding.

* * * * *